(12) United States Patent
Manseau (10) Patent No.: US 6,629,219 B1
(45) Date of Patent: Sep. 30, 2003

(54) METHOD AND APPARATUS FOR PROVIDING HIGHLY PROGRAMMABLE MEMORY MAPPING AND IMPROVED INTERLEAVING

(75) Inventor: Daniel A. Manseau, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/541,448

(22) Filed: Mar. 31, 2000

(51) Int. Cl.[7] ............................................. G06F 12/00
(52) U.S. Cl. .................. 711/157; 711/5; 711/202; 711/220
(58) Field of Search ....................... 711/202, 127, 711/5, 157, 170–173, 220; 345/540

(56) References Cited

U.S. PATENT DOCUMENTS 5,530,837 A    6/1996 Williams et al.
5,848,258 A   12/1998 Fenwick et al.
6,131,146 A   10/2000 Aono
6,185,654 B1   2/2001 Van Doren

FOREIGN PATENT DOCUMENTS

EP                0540198 A1    5/1993

Primary Examiner—Nasser Moazzami
(74) Attorney, Agent, or Firm—Blakely, Sokoloff, Taylor & Zafman LLP (57) ABSTRACT

A method and apparatus for providing highly programmable memory mapping and improved interleaving includes a system address chip that maps a received memory transaction address to an intermediate address for accessing a memory array having at least one individually addressable memory row. During the translation the memory array is logically partitioned into a plurality of individually addressable memory blocks such that each of said memory blocks are interleavingly accessible independent of how said memory array is populated. The apparatus includes logic to generate at least a portion of the intermediate address by combining selected bits of the transaction address with selected bits of a programmed block address based in part upon the received transaction address.

27 Claims, 5 Drawing Sheets

METHOD AND APPARATUS FOR PROVIDING HIGHLY PROGRAMMABLE MEMORY MAPPING AND IMPROVED INTERLEAVING

BACKGROUND OF THE INVENTION

1. Field of the Invention

The present invention generally relates to memory addressing. More specifically, the present invention relates to a method and apparatus for providing highly programmable memory mapping and improved interleaving.

2. Background Information

Memory mapping is the process of translating a nominal memory address (issued e.g. by a processor) to an actual memory address appropriate for accessing a memory array. Such translation is necessary as data are often stored in an interleaving manner to decrease overall latency of systems and improve memory access times. Interleaving is a technique that involves dividing a memory array into two or more sections such that successive memory access requests can be directed to different sections of the memory. A system that performs 4-way interleaving, for example, will typically divide a corresponding memory into four sections. By directing the accesses to different sections of memory, overlapping memory requests may be made without interfering with each other thereby decreasing the need for the processor to insert wait states.

Unfortunately, however, conventional memory mapping systems typically require that all slots or rows within a memory array be populated and/or all memory devices within a memory array be of the same size in order to be interleaved. For example, assume that a given memory array consists of four rows of Synchronous Dynamic Random Access Memory (SDRAM) in which row 1 contains a 128 MB memory module, row 2 contains a 64 MB memory module, row 3 contains a 64 MB memory module and row 4 is empty. Conventional systems would not be capable of interleaving between the various rows of memory because rows 1 through 4 contain varying amounts of memory. Even if rows 1 through 3 each contained 64 MB of memory, however, some conventional systems would nonetheless still not be able to interleave unless row 4 contained the same amount of memory as rows 1 through 3 (64 MB).

SUMMARY OF THE INVENTION

According to one aspect of the invention, a multi-bit transaction address is received that specifies one or more memory locations of a memory array having at least one individually addressable memory row. The multi-bit transaction address is mapped to an intermediate memory address through a logical partitioning of the memory array into a plurality of individually addressable memory blocks such that each of the memory blocks are interleavingly accessible independent of how the memory array is populated. The memory array is then accessed using said mapped intermediate memory address.

BRIEF DESCRIPTION OF THE DRAWINGS

The invention is illustrated by way of example, and not by way of limitation in the figures of the accompanying drawings in which like reference numerals refer to similar elements.

DETAILED DESCRIPTION

A method and apparatus for providing highly programmable memory mapping and improved interleaving is disclosed. In the following description, for purposes of explanation, numerous specific details are set forth in order to provide a thorough understanding of the present invention. It will be apparent, however to one skilled in the art that the present invention can be practiced without these specific details. In other instances, well-known structures and devices are shown in block diagram form to avoid obscuring the present invention.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMS, magneto-optical disks, read-only memories (ROMs), random access memories (RAMs), EPROMs, EEPROMs, magnetic or optical cards, or any type of media suitable for storing electronic instructions, and each coupled to a computer system bus. The algorithms and displays presented herein are not inherently related to any particular computer or other apparatus. Various general purpose machines may be used with programs in accordance with the teachings herein, or it may prove convenient to construct more specialized apparatus to perform the required method steps. The required structure for a variety of these machines will appear from the description below.

Although all or some of the operations may be performed by digital logic and/or circuitry, an integrated circuit (e.g., ASIC) or other semiconductor substrates, some or all of these operations may be performed by software executing on one or more processing devices (e.g., CPUs) on a computer system or specialized apparatus. Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
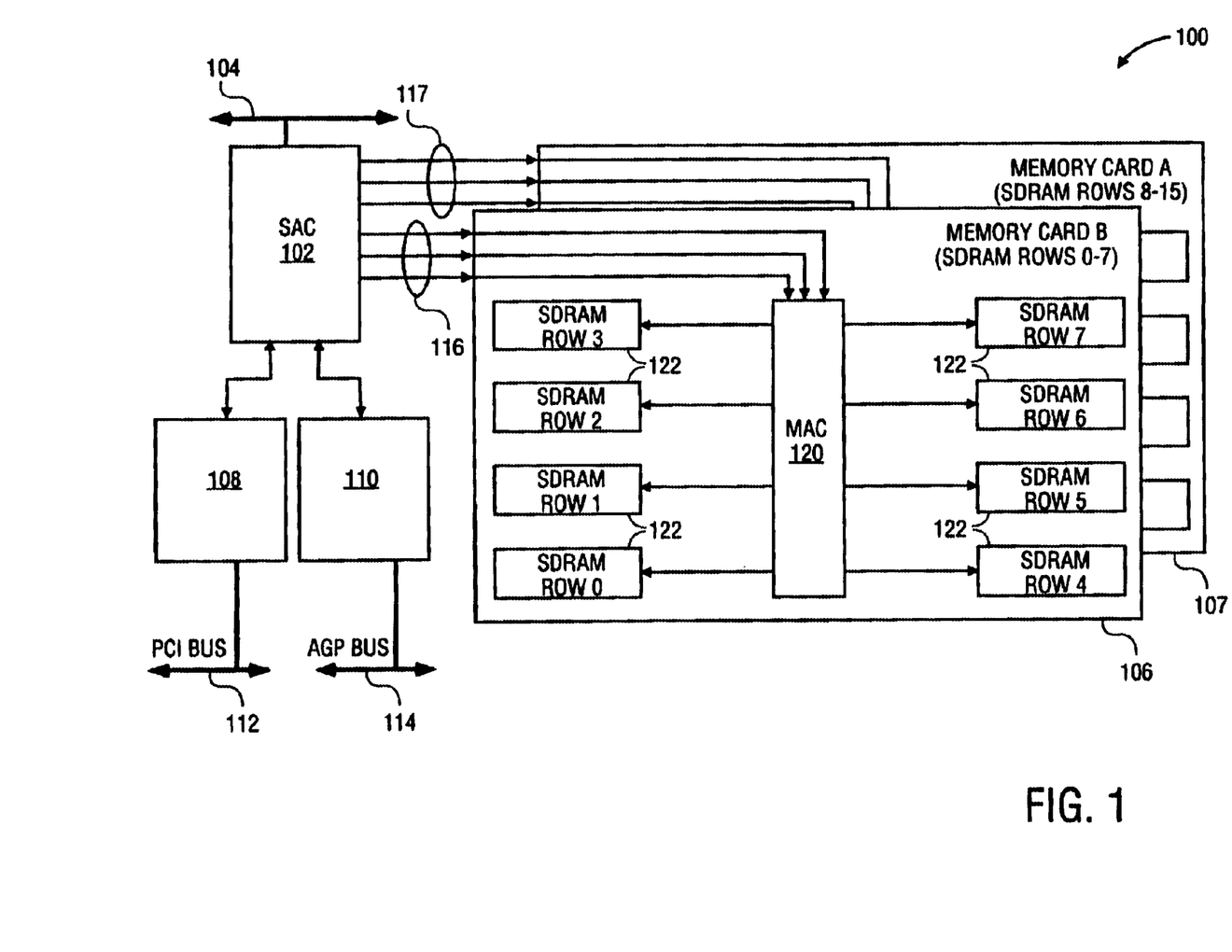
FIG. 1 is a block diagram illustrating a memory subsystem according to one embodiment of the present invention.

FIG. 1 is a block diagram illustrating memory subsystem 100 according to one embodiment of the present invention. Memory subsystem 100 includes system address chip (SAC) 102, bus arbitration logic 108 and 110, processor bus 104, secondary buses 112 and 114, and memory cards 106 and 107. SAC 102 is directly coupled to processor bus 104 and indirectly coupled to secondary buses 112 and 114 through arbitration logic 108 and 110 respectively. In one embodiment, secondary buses 112 and 114 represent at least one of a Peripheral Connect Interface (PCI) bus and an Accelerated Graphic Port (AGP) bus. SAC 102 receives transaction addresses via the various buses, determines what action(s) to take with regard to the received transaction, and initiates such action(s) accordingly. For example, if SAC 102 determines that a received transaction address relates to memory, SAC 102 translates the address into an intermediate memory address which is then sent to one of memory cards 106 and 107 as necessary.

SAC 102 is coupled to memory cards 106 and 107 via signal lines 116 and 117 respectively. Although signal lines 116 and 117 are illustrated as being three independent signal lines, the actual number of signal lines coupling SAC 102 to memory cards 106 and 107 may vary. Memory cards 106 and 107 represent at least a portion of a memory array including multiple memory sockets 122 and a memory control logic 120. In one embodiment, memory control logic 120 receives row, memory address, bank and chunk bits from SAC 102 via signal lines 116 and 117. The various signals received by memory control logic 120 are used to access the various memory devices affixed to memory sockets 122 on memory cards 106 and/or 107 according to methods understandable to one skilled in the art.

For ease of understanding, both memory cards 106 and 107 are assumed to be substantially similar in their configuration. Accordingly, the invention described herein will be discussed with reference to memory card 106. It should be assumed, therefore, that all features and characteristics discussed with respect to memory card 106, equally apply to memory card 107 unless otherwise noted. However, in alternate embodiments, memory cards 106 and 107 may be dissimilar. In one embodiment, memory card 106 utilizes dual in-line memory modules (DIMMs) comprising Synchronous Dynamic Random Access Memory (SDRAM) devices. In one embodiment, memory sockets 122 are arranged on memory card 106 so as to form rows and stacks of memory. For example, memory card 106 includes rows 0 through 7, whereby rows 0 through 3 form a first stack and rows 4 through 7 form a second stack. In one embodiment, a row of memory represents one or more DIMMs which provide a cache line of data for each memory access. In one embodiment, each row contains the same size and type of DIMMs, however, the size and type of DIMMs can nonetheless vary from one row to another. In one embodiment the minimum row size is 64 MB and the maximum row size is 4 GB.

EXEMPLARY MEMORY CONFIGURATION

Figure 2:
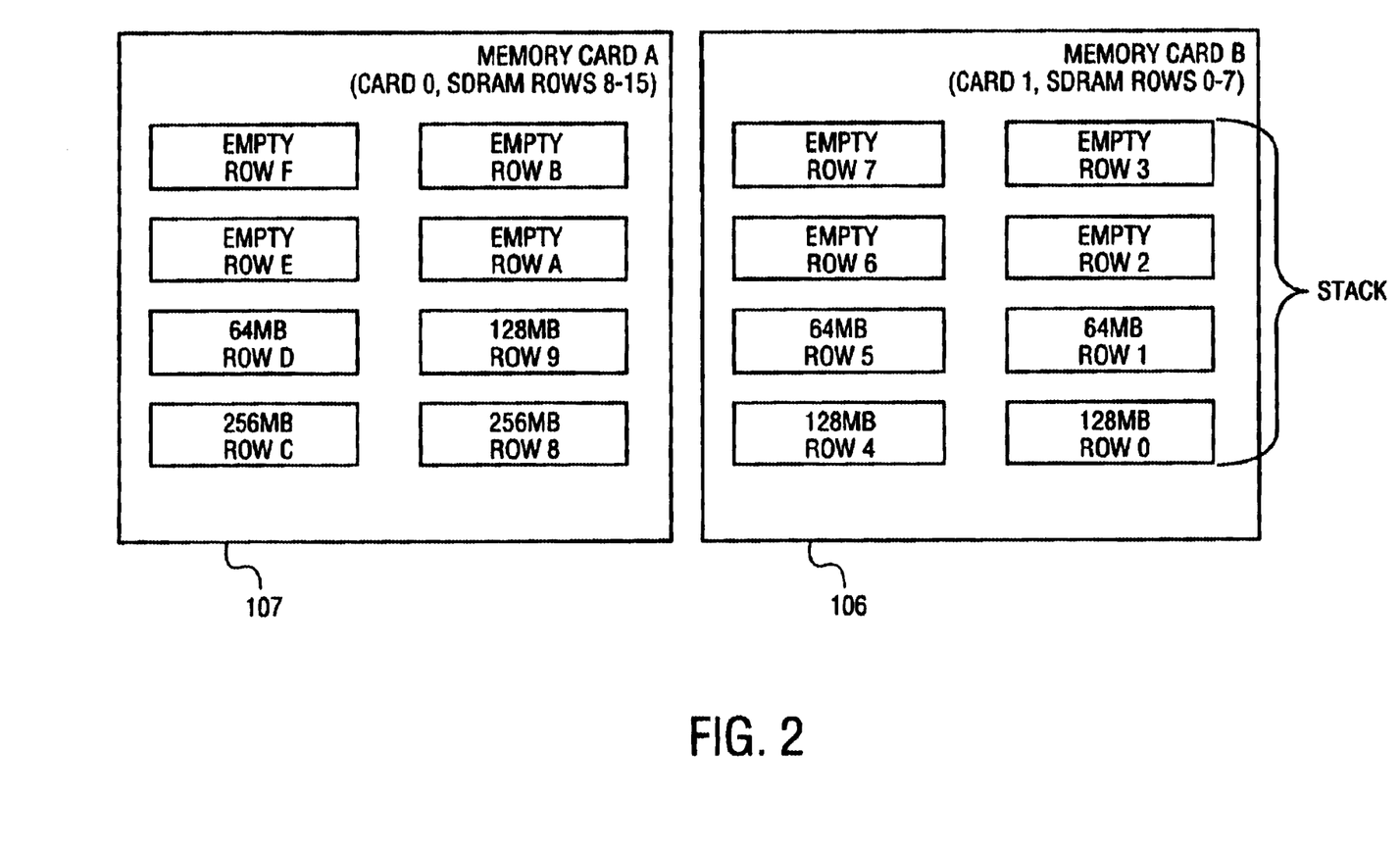
FIG. 2 is a block diagram illustrating an exemplary memory configuration according to one embodiment of the present invention.

FIG. 2 is a block diagram illustrating an exemplary memory configuration according to one embodiment of the present invention. Memory card 106 includes memory rows 0 through 7 with rows 0 through 3 forming a first stack and rows 4 through 7 forming a second stack. Similarly, memory card 107 includes memory rows 8 through (or 8 through F in Hexadecimal) with rows 8 through B forming a third stack and rows C through F forming a fourth stack. In memory card 106, for illustrative purposes, rows 0 and 4 contain 128 Mb of memory, rows 1 and 5 contain 64 MB of memory, and rows 2, 3, 6 and 7 are empty. In memory card 107, also for illustrative purposes, rows 8 and C contains 256 MB of memory, row 9 contains 128 MB of memory, row D contains 64 MB of memory, and rows A, B, E and F are empty.

It will be appreciated that the various memory row and stack configurations are shown for illustrative purposes only and should not be read as limiting the invention. For example, a fewer or a greater number of rows, stacks and/or cards may be included within the memory subsystem depending upon the architecture requirements. Similarly, although row designations are illustrated numerically, alphabetical designations may also be employed.

EXEMPLARY OPERATION

In the SAC address translation process, the memory array is logically divided into multiple non-overlapping sections or "ranges" of memory. In one embodiment, a maximum of 16 memory ranges are logically created. It should be noted that the use of the terms "logical" and "logically" are to be contrasted with "physical" and "physically." That is, during the mapping and/or interleaving process, the memory array is not physically altered but rather the associated control circuitry logically partitions the memory to appear as though the memory was physically separated into independent ranges.

To increase the benefits of interleaving, each memory range is defined using the largest common memory size available across the various stacks. The largest common memory size is considered to be the unit of interleaving and is referred to as the block size. In one embodiment, in order to further increase the benefits of interleaving, each row containing an amount of memory larger than the determined block size is logically subdivided into multiple subsections to accommodate the smaller block size.

If a memory row shares a common boundary with a given memory range, the memory row and memory range will share a common memory address indicating that boundary. Likewise, subdivided sections of memory rows that align with range boundaries will also share a common memory address with the memory range. If, however, a memory row or subdivided section of memory do not share a boundary with a given memory range, additional addressing information is necessary to access the memory row or section. In one embodiment, address translation architecture of the present invention (shown in FIG. 4) is equipped to address memory rows and subdivided memory sections independent of whether or not they share a boundary with a memory range. In one embodiment, separate address registers are utilized to store additional addressing information necessary to access memory rows and subdivided memory sections that do not share a boundary with a memory range.

For example, in FIG. 2, even though rows C and 8 of memory card 107 contain 256 MB of memory, the largest common block size available across all stacks of all memory cards is only 128 MB. Therefore, according to one embodiment of the present invention, the rows containing 256 MB of memory are logically subdivided into two equally-sized 128 MB sections in order to accommodate a block size of 128 MB. If the block size for the first memory range (range 0) is set to be 128 MB, then the first memory range would have a size of 512 MB (e.g. 128 MB * 4 rows). In one embodiment, at least one row register is used to store data indicating which rows are to be used within the given memory range. For example, by storing the value "OXC480" in the row register, cachelines (0,4) are placed in row 0, cachelines (1,5) are placed in row 8, cachelines (2,6) are placed in row 4, and cachelines (3,7) are placed in row C.

The next memory range (range 1) in the array starts 512 MB into the memory array or in other words, directly following the memory allocation for range 0. For range 1, the largest common block size is not selected to be 128 MB since there are only three rows (rows 8, 9 and C) which have 128 MB of memory or more remaining. Therefore, the largest common block size is selected to be 64 MB. In one embodiment of the invention, the value "0xC581" is stored in the row register to indicate that rows C, 5, 8 and 1 have been selected so as to again facilitate interleaving between stacks. Recall that up to this point only the lower 128 MB of row C and row 8 have been allocated leaving the upper 128 MB of each row available for use. Because the next largest common block size is 64 MB, the remaining upper 128 MB of memory in each of rows C and 8 is further divided into two 64 MB blocks of memory. Because neither of the 64 MB blocks share a memory range boundary, additional address information is required for the system to access either of the 64 MB blocks. If the first (lower) of the 64 MB memory blocks is selected for example, address information reflecting a position of 128 MB into the memory row is necessary. In one embodiment, such address information is stored in at least one address register. In an embodiment where the address register maintains a granularity of 16 MB, the value of "0×8" (8 * 16 MB=128 MB) is loaded into the address register to reflect the starting position of the lower 64 MB.

Figure 3:
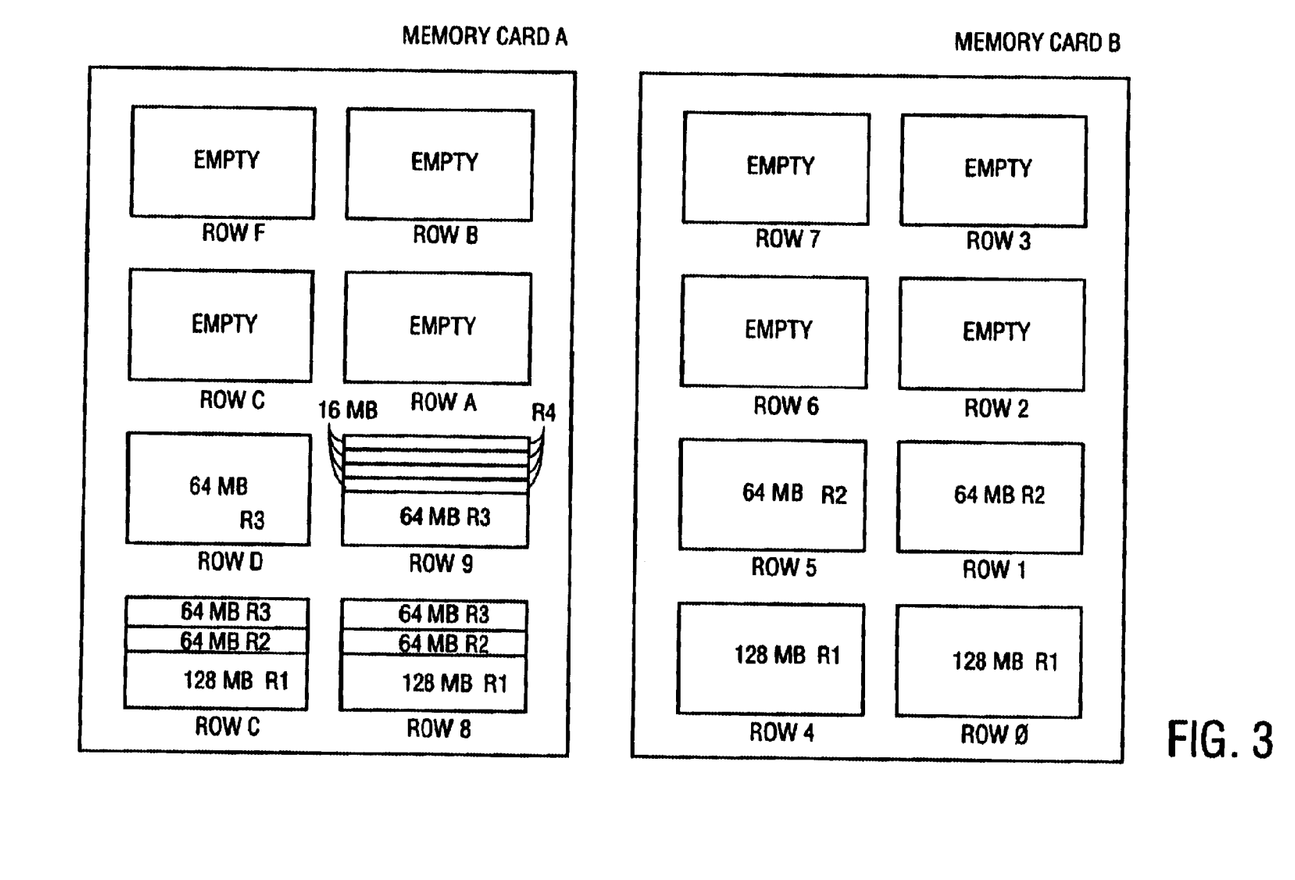
FIG. 3 is a block diagram illustrating memory block size and range allocation for a given memory configuration.

For memory range 2, the largest common block size is 64 MB as reflected by the remaining memory in rows 8, C, 9 and D. The remaining 64 MB memory sections of rows 8 and C are used in conjunction with one half of row 9 (128 MB/2=64 MB), and all of row D. For memory range 3, however, only the upper half of row 9 remains unallocated in the memory array. Row 9 is therefore further divided into 4 equally-sized blocks of 16 MB each. The memory row register is updated to reflect that all the memory blocks for this range reside in row 9 and the address register is set to index these 16 MB blocks starting at 64 MB from the base of the row. FIG. 3 is a block diagram illustrating the amount of memory allocated to each range and the range to which the memory was allocated as described in the above example. In FIG. 3, rows 0 through F are shown subdivided into the various selected block sizes, and reference numbers R1 through R4 illustrate the range according to which each memory block was to allocated.

ADDRESS TRANSLATION ARCHITECTURE

Figure 4:
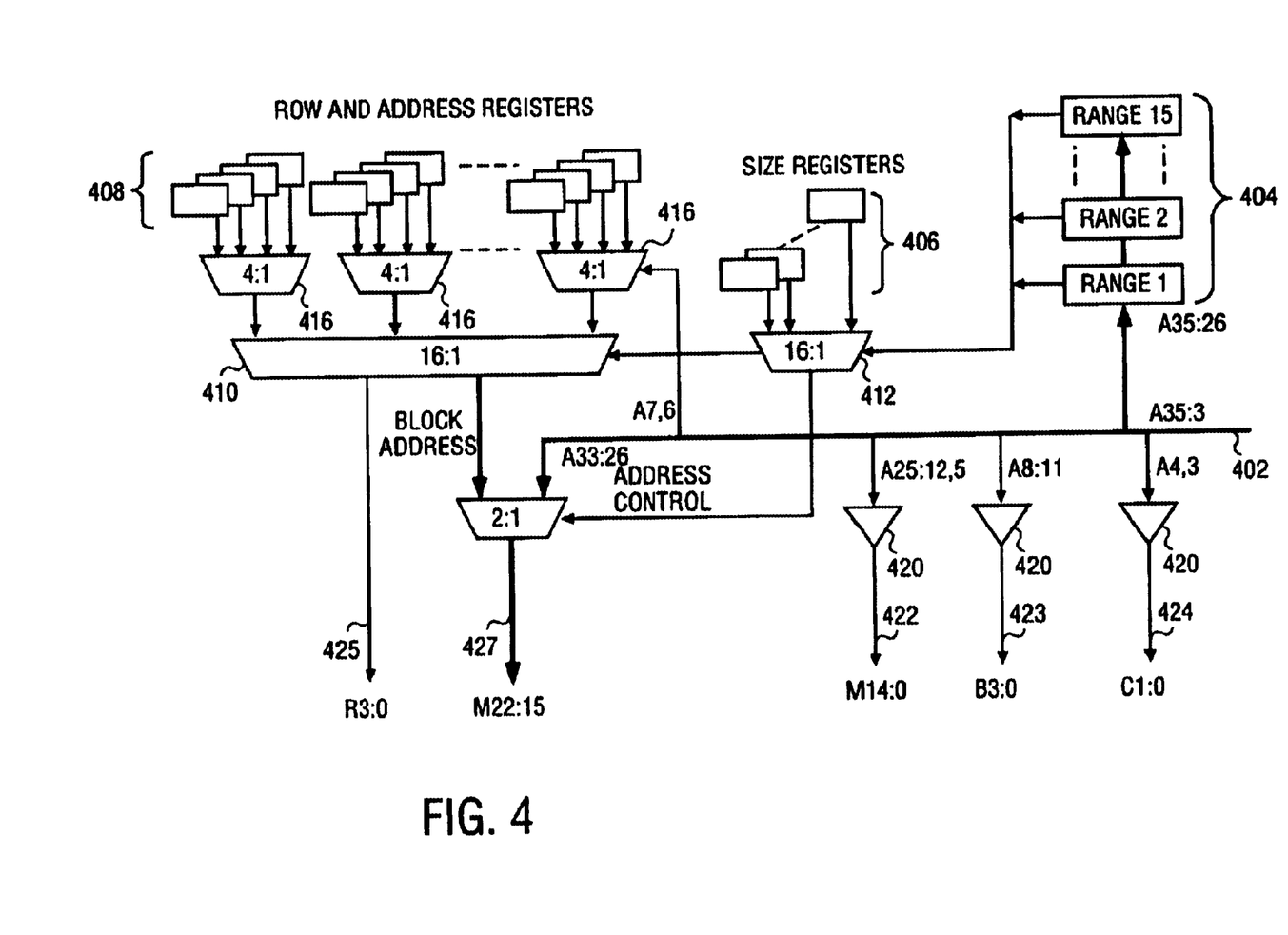
FIG. 4 is a block diagram illustrating address translation architecture according to one embodiment of the present invention.

FIG. 4 is a block diagram illustrating address translation architecture according to one embodiment of the present invention. In one embodiment, address translation architecture 400 is located within SAC 102 of FIG. 1. Address translation architecture 400 maps a transaction address received over one of a variety of data buses, such as transaction address bus 402, into an intermediate row and column address format for accessing an installed memory array. In one embodiment, address translation architecture 400 receives transaction addresses over at least one of a processor bus, a PCI bus and a AGP bus.

Address translation architecture 400 includes range selection logic 404, block size registers 406, row and address registers 408, buffers 420, and multiplexors (MUXs) 410, 412, 414 and 416. In one embodiment, address translation architecture 400 receives 33-bit transaction addresses on transaction bus 402. When a transaction address is received on transaction bus 402, address translation architecture 400 identifies a range of memory to which the received transaction address corresponds based upon at least a subset of the received transaction address bits. In one embodiment, the same subset of transaction address bits used to determine a memory range is also coupled to MUX 414 as selectable source data. Some of the remaining transaction address bits are utilized as selector lines for MUXs 416 and others of the remaining transaction address bits are transmitted directly to the memory array after passing through buffers 420.

In one embodiment of the present invention, the transaction address bits that are passed directly through buffers 420 form critical chunk signal lines 424, bank signal lines 423, and lower memory address signal lines 422. Critical chunk bits carried by critical chunk signal lines 424 determine the burst order when transferring a cache line. In one embodiment, critical chunk bits have a value of "0" for cache line writes and for cache line reads the bits are taken directly from transaction address bus 402. Bank signal lines 423 determine which bank within a row of memory is to be accessed, whereas memory address lines 422 are the lower portion of address lines used to address the memory array.

Range selection logic 404 includes range data registers and associated comparators to divide the address space into multiple non-overlapping memory ranges. In one embodiment of the present invention, range selection logic 404 divides the address space into a maximum of 16 memory ranges. In one embodiment, memory ranges start and end on 64 MB boundaries and the value loaded into each range data register indicates the lower boundary of each corresponding range. In one embodiment, the values in the range data registers are organized in ascending order such that each subsequent range data register indicates a memory range larger than is indicated by each previous range data register.

Figure 5:
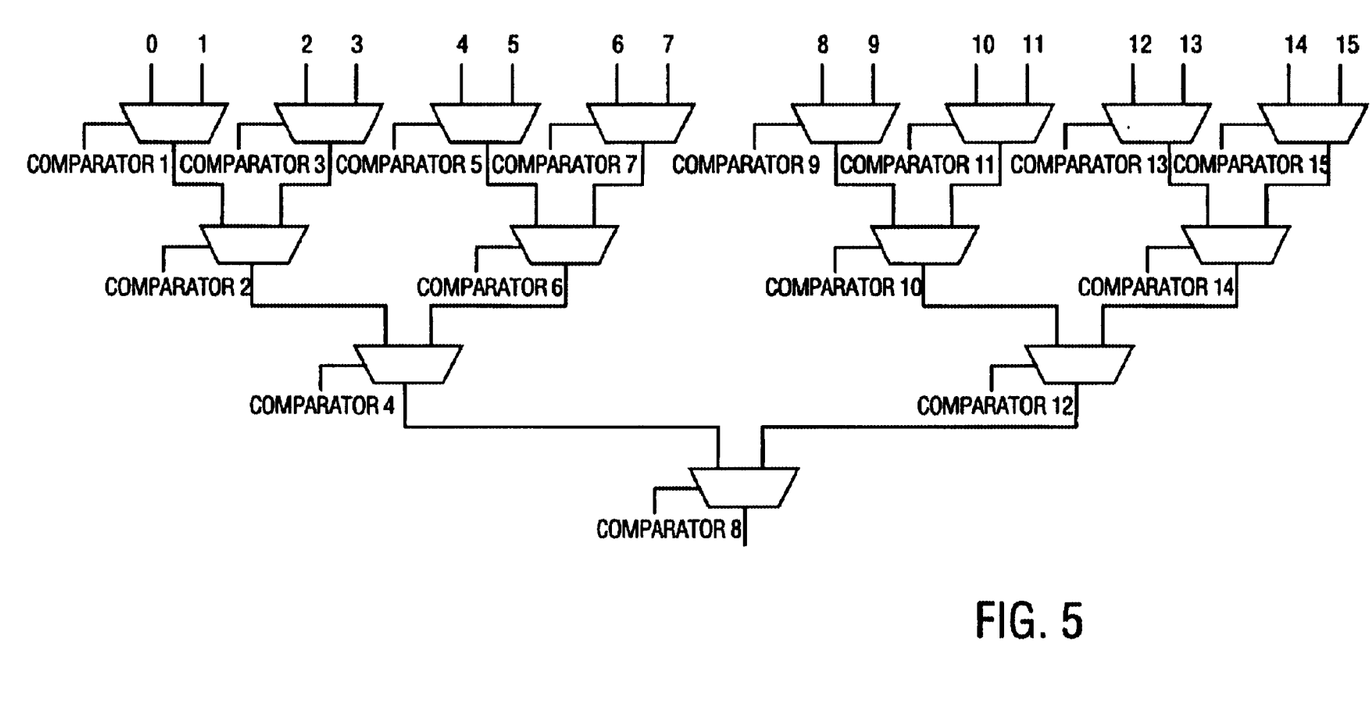
FIG. 5 is a block diagram illustrating a mutiplexor implementation using 2:1 multiplexors and associated comparators according to one embodiment of the present invention.

Each of the comparators in range selection logic 404 compares the value stored in an associated range data register with at least a subset of the transaction address bits. In one embodiment, the comparator returns a "1" if the transaction address bits represent a value that is less than the value stored in the associated range data register and the comparator returns a "0" if the transaction address bits represent a value that is greater than the value stored in the associated range data register. In one embodiment, a memory range is selected when its corresponding comparator returns a '0', and a comparator corresponding to the next larger memory range returns a '1'. Although MUX 410 and MUX 412 are each shown as 16-to-1 (i.e. 16:1) multiplexors, equivalent functionality may be obtained by coupling the results of each of the comparators to a set of fifteen 2:1 multiplexors for example. FIG. 5 is a block diagram illustrating an equivalent mutiplexor implementation using fifteen 2:1 multiplexors and associated comparators according to one embodiment of the present invention.

Referring once again to FIG. 4, block size registers 406 represent data registers that indicate a block size to be used for each selected memory range. In one embodiment, there exists one block size register for each one of the range data registers. In one embodiment, the block size is set to be the largest common block size available across all unallocated rows of memory within a specified memory range. In some circumstances, as described above, a block of memory may not share a boundary with a memory range, and additional addressing information may therefore be necessary to access such memory. For example, recall that in FIG. 3, row 8 contained 256 MB of memory but was subdivided into one 128 MB section and two 64 MB sections. In that example, neither of the 64 MB sections shared a common boundary with the memory range. In one embodiment of the present invention, binary data stored in association with each of the block size registers are utilized to indicate when additional addressing information is necessary to access a memory block.

Table 1 below illustrates block sizes along with corresponding binary values that would be loaded into size registers 406 to reflect the associated block size.

TABLE 1

| BLOCK SIZE | VALUE |
|---|---|
| 16 MB | 00000000 |
| 32 MB | 00000001 |
| 64 MB | 00000011 |
| 128 MB | 00000111 |
| 256 MB | 00001111 |
| 512 MB | 00011111 |
| 1 GB | 00111111 |
| 2 GB | 01111111 |
| 4 GB | 11111111 |

Once a memory range and block size are selected, the binary values associated with the block size are passed through MUX 412 and are utilized as select lines into MUX 414. MUX 414 determines at least a portion of an intermediate memory address used to access the memory array by selectively combining bits from transaction bus 402 with bits from row and address registers 408. In one embodiment, the binary values loaded into block size registers 406, select the source of the upper eight address lines going to the memory array. In one embodiment, if the value of a bit in a selected block size register is "1" then the corresponding address line is taken from transaction bus 402. If the value of the bit is a "0", however, then,the address line is taken from row and address registers 408.

Row and address registers 408 store additional row and address data used by address translation hardware 400 to locate and address selected memory blocks within the memory array. In one embodiment, row and address registers 408 represent a number of row and address registers that corresponds to the number of memory ranges indicated by the range data registers. In one embodiment, row and address registers 408 include 16 row registers and 16 address registers. In one embodiment, a subset of address lines from transaction address bus 402 select between the various row and address registers 408.

In one embodiment, the data stored within row and address registers 408 is passed through MUXs 416 and utilized as source data for MUX 410. MUX 410 selects between the various row and address data based upon selection information provided by range data registers 404. In one embodiment, row bits indicating which rows of memory are to be accessed are passed to the memory array via row signal line 425. In one embodiment, a first one of the row bits indicates the memory card to be accessed, a second one of the row bits indicates the stack on the indicated memory card to be accessed, and third and fourth ones of the row bits together indicate the row within the stack to be accessed.

MEMORY GAP RECOVERY

The novel memory mapping technique described herein is also useful for avoiding memory mapped input and output (I/O) gaps created in a memory range. When a section of system memory is used for I/O, a gap is typically formed in the normally contiguous system memory. Conventional designs map the memory under the I/O space to different locations within system memory so as to not lose the memory used for I/O transactions. To accomplish this, however, additional logic such as an adder is required by the conventional systems. In contrast, the novel memory mapping method and apparatus described herein provides the ability to map around existing I/O gaps without requiring additional dedicated mapping logic other than that necessary to determine if a transaction address is directed to memory or I/O.

For example, assume that a system containing 8 GB of available memory has an addressable memory range from 0 to 8 GB-1, and has a 64 MB gap reserved for memory mapped I/O at 4 GB–64 MB. To account for the gap, the mapping registers (including size registers) would be programmed as normally up to the bottom of the I/O gap. Under normal circumstances the next range would have the next range data register programmed for the next address which would be 4 GB–64 MB. To create the gap, however, the next range data register is instead programmed with 4 GB. Because the size of the previous range does not match the next range address, a gap is generated. If a memory transaction is directed to the newly created I/O gap, an address is generated that points to some area other than the reserved I/O gap. In one embodiment, the generated address points to a memory location directly below the I/O gap.

Thus, a method and apparatus for providing highly programmable memory mapping and improved interleaving has been disclosed. In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A method comprising:

receiving a multi-bit transaction address specifying one or more memory locations of a memory array to be accessed, said memory array having at least one individually addressable memory row;

mapping said multi-bit transaction address to an intermediate memory address, wherein said mapping includes logically partitioning said memory array into a plurality of individually addressable memory blocks such that each of said memory blocks are interleavingly accessible independent of how said memory array is populated; and accessing said memory array using said mapped intermediate memory address, wherein at least a portion of said intermediate memory address is generated by combining selected bits of said transaction address with selected bits of a programmable block address as determined at least in part by said transaction address.

2. The method of claim 1, wherein said mapping further includes determining a block size for said memory blocks based upon a memory range corresponding to said transaction address.

3. The method of claim 1, wherein said plurality of individually addressable memory blocks includes four equally-sized memory blocks.

4. The method of claim 1, wherein each of said plurality of individually addressable memory blocks is located in a different stack of memory.

5. The method of claim 1, wherein all of said plurality of individually addressable memory blocks are located within a first stack of memory and within a plurality of individually addressable memory rows.

6. The method of claim 1, wherein said plurality of individually addressable memory blocks are located within more than one memory card.

7. A method comprising:
receiving a multi-bit transaction address specifying one or more memory locations of a memory array to be accessed, the memory array having at least one individually addressable memory row;
mapping the multi-bit transaction address to an intermediate memory address, wherein the mapping includes logically partitioning the memory array into a plurality of individually addressable memory blocks to allow each of the memory blocks to be interleavingly accessible independent of how the memory array is populated, and determining a block size for the memory blocks based upon a memory range corresponding to the transaction address, wherein if the block size indicates an amount of memory less than an amount of memory indicated by the memory row, then at least a portion of the intermediate memory address is generated using programmable block address bits stored in an address register; and
accessing the memory array using the mapped intermediate memory address.

8. The method of claim 7, wherein determining said block size includes determining a corresponding plurality of stored bits that function to form at least a portion of said intermediate memory address by combining selected ones of said programmable address bits with selected ones of said transaction address bits.

9. The method of claim 8, wherein if one of said stored bits represents a first value then a corresponding intermediate address line is determined by said transaction address bus, and if said one of said stored bits represents a second value then said corresponding intermediate address line is determined by said programmable block address.

10. A method, comprising:
receiving a multi-bit transaction address specifying one or more memory locations of a memory array to be accessed, the memory array having at least one individually addressable memory row;
mapping the multi-bit transaction address to an intermediate memory address, wherein the mapping includes logically partitioning the memory array into a plurality of individually addressable memory blocks to allow each of the memory blocks to be interleavingly accessible independent of how the memory array is populated; and
accessing said memory array using said mapped intermediate memory address, wherein all of the plurality of individually addressable memory blocks are located in a first of the at least one individually addressable memory row.

11. An apparatus comprising:
an interface to receive a multi-bit transaction address specifying one or more memory locations of a memory array to be accessed, said memory array having at least one individually addressable memory row; and
memory mapping logic coupled to said interface to map said multi-bit transaction address to an intermediate memory address for accessing said memory array, wherein said memory mapping logic includes logic to partition said memory array into a plurality of individually addressable memory blocks such that each of said memory blocks are interleavingly accessible independent of how said memory array is populated and to selectively combine selected bits of said transaction address with selected bits of a programmable block address based at least in part on said transaction address.

12. The apparatus of claim 11, wherein said memory mapping logic further comprises block size selection logic to select a block size for said memory blocks based upon a memory range corresponding to said transaction address.

13. The apparatus of claim 11, wherein said plurality of individually addressable memory blocks includes four equally-sized memory blocks.

14. The apparatus of claim 11, wherein each of said plurality of individually addressable memory blocks is located in a different stack of memory.

15. The apparatus of claim 11, wherein all of said plurality of individually addressable memory blocks are located within a first stack of memory and within a plurality of individually addressable memory rows.

16. The apparatus of claim 11, wherein said plurality of individually addressable memory blocks are located within more than one memory card.

17. An apparatus comprising:
an interface to receive a multi-bit transaction address specifying one or more memory locations of a memory array to be accessed, the memory array having at least one individually addressable memory row;
memory mapping logic coupled to the interface to map the multi-bit transaction address to an intermediate memory address for accessing the memory array, wherein the memory mapping logic includes logic to partition the memory array into a plurality of individually addressable memory blocks to allow each of the memory blocks to be interleavingly accessible independent of how the memory array is populated, the memory mapping logic further includes block size selection logic to select a block size for the memory blocks based upon a memory range corresponding to the transaction address; and
a plurality of row registers to store data specifying which memory row to access based upon the memory range.

18. An apparatus comprising:
an interface to receive a multi-bit transaction address specifying one or more memory locations of a memory array to be accessed, the memory array having at least one individually addressable memory row;
memory mapping logic coupled to the interface to map the multi-bit transaction address to an intermediate memory address for accessing the memory array, wherein the memory mapping logic includes logic to partition the memory array into a plurality of individually addressable memory blocks to allow each of the memory blocks to be interleavingly accessible independent of how the memory array is populated, the memory mapping logic further includes block size selection logic to select a block size for the memory blocks based upon a memory range corresponding to the transaction address; and
a plurality of address registers to store address bits for addressing at least one of the plurality of memory blocks if said block size indicates an amount of memory less than an amount of memory indicated by the memory row.

19. An apparatus comprising:
an interface to receive a multi-bit transaction address specifying one or more memory locations of a memory array to be accessed, the memory array having at least one individually addressable memory row;
memory mapping logic coupled to the interface to map the multi-bit transaction address to an intermediate memory address for accessing the memory array, wherein the memory mapping logic includes logic to partition the memory array into a plurality of individually addressable memory blocks to allow each of the memory blocks to be interleavingly accessible independent of how the memory array is populated, wherein all of the plurality of individually addressable memory blocks are located in a first of the at least one individually addressable memory row.

20. A method comprising:

receiving a transaction address via a transaction bus;

identifying a memory range corresponding to said transaction address;

selecting a block size and associated block address information based at least in part on said identified memory range; and determining at least a portion of a memory address by selectively combining a selected number of bits from each of said transaction address and said identified block address as determined by said block size.

21. The method of claim 20, wherein said block size corresponds to a plurality of selection bits used to select between said transaction address and said identified block address.

22. A method comprising:

receiving a transaction address via a transaction bus;

identifying a memory range corresponding to the transaction address;

selecting a block size and associated block address information based at least in part on the identified memory range, wherein the block address information facilitates access of memory that is not aligned with a data cacheline; and determining at least a portion of a memory address by selectively combining a selected number of bits from each of the transaction address and the identified block address as determined by the block size.

23. An integrated circuit comprising:

identification logic to identify a memory range corresponding to a received transaction address;

selection logic to select a block size and an associated block address based on said identified memory range; and determination logic to determine at least a portion of a memory address by selectively combining a selected number of bits from each of said transaction address and said identified block address based upon said selected block size.

24. The integrated circuit of claim 23, wherein said identification logic comprises a plurality of comparators to compare a received transaction address with a plurality of stored memory range values.

25. The integrated circuit of claim 23, wherein said determination logic comprises at least one multiplexor having selector lines coupled to the output of said selection logic.

26. A system comprising:

a bus;

a processor coupled to the bus;

a memory array coupled to the bus having at least one individually addressable memory row; and mapping logic coupled to the bus to receive a multi-bit transaction address from said processor and map said multi-bit transaction address to an intermediate memory address for accessing the memory array, wherein said mapping logic includes logic to partition said memory array into a plurality of individually addressable memory blocks such that each of said memory blocks are interleavingly accessible by said processor independent of how said memory array is populated and to selectively combine selected bits of said transaction address with selected bits of a programmable block address based at least in part on said transaction address.

27. The system of claim 26, wherein said mapping logic generates at least a portion of said intermediate memory address based upon said selectively combined bits.

* * * * *

UNITED STATES PATENT AND TRADEMARK OFFICE
CERTIFICATE OF CORRECTION

PATENT NO. : 6,629,219 B1  Page 1 of 1
DATED : September 30, 2003
INVENTOR(S) : Manseau

It is certified that error appears in the above-identified patent and that said Letters Patent is hereby corrected as shown below:

<u>Column 3,</u>
Line 53, after "through", insert -- 15 --.

<u>Column 5,</u>
Line 37, after "block was", delete "to".

Signed and Sealed this

Sixteenth Day of March, 2004

JON W. DUDAS
*Acting Director of the United States Patent and Trademark Office*